Patented May 9, 1939

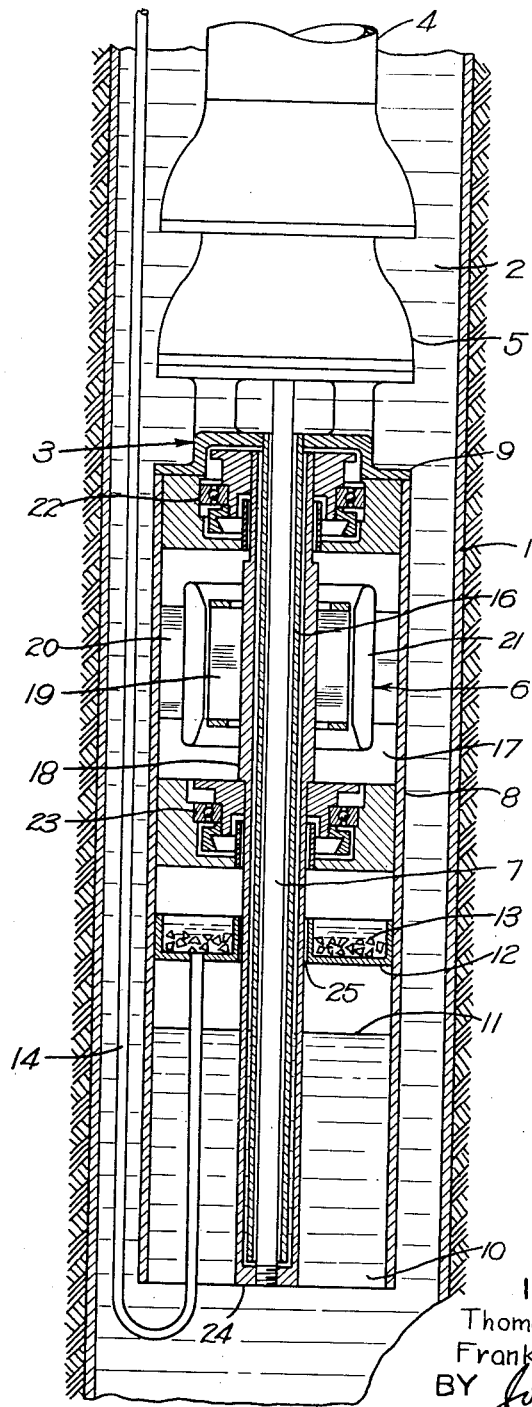

2,157,424

UNITED STATES PATENT OFFICE 2,157,424

SUBMERSIBLE ELECTRIC MOTOR

Thomas G. Myers, Los Angeles, Calif., and Frank Mason, Chicago, Ill., assignors to U. S. Electrical Motors, Inc., a corporation of California Original application February 27, 1932, Serial No. 595,590. Divided and this application August 23, 1937, Serial No. 160,482

4 Claims. (Cl. 172—36)

This invention relates to deep well pumps, and especially to submersible electric motors for operating such pumps.

This application is a division of an application filed in the names of Thomas G. Myers and Frank Mason for Submersible pump motor, February 27, 1932, Serial No. 595,590.

It is common to pump liquid from a deep well, such as an oil or a water well, by submerging a pump and a motor in the well. This necessitates careful sealing of the motor casing to prevent ingress of the liquid being pumped, to the motor, as otherwise the motor windings or other parts will be injured.

It has been suggested to obviate the necessity of such sealing and at the same time to prevent the well liquid reaching the motor, by supporting the motor in the top of a bell-like structure, the bottom only of which is open. When such a structure is submerged, the air trapped therein is compressed and serves to prevent the liquid from reaching the motor. It forms a gaseous atmosphere in which the motor operates.

Due to the slight porosity of the materials used, and other causes, as for instance those incident to the operation of the motor, this trapped air may be lost slowly from the bell. It is accordingly an object of this invention to provide means for replenishing the gaseous atmosphere surrounding the motor.

It is another object of this invention to provide a chemical reagent in the motor housing, this reagent evolving gas to replenish the gaseous atmosphere surrounding the motor.

It is still another object of this invention to provide means for supplying this chemical reagent to the housing from the top of the well.

This invention possesses many other advantages, and has other objects which may be made more easily apparent from a consideration of one embodiment of the invention. For this purpose there is shown a form in the drawing accompanying and forming part of the present specification. This form will now be described in detail, illustrating the general principles of the invention; but it is to be understood that this detailed description is not to be taken in a limiting sense, since the scope of this invention is best defined by the apended claims.

Referring to the drawing, the single figure is a diagrammatic view showing a submersible pumping unit in operative position in a well, with means for replenishing the gaseous atmosphere which surrounds the motor.

In the drawing, there is shown, by way of example, a well casing 1, from which a liquid 2, usually water, or a mixture of water and other substances, is to be pumped out. Suspended in the well, is a pumping unit 3 attached to the lower end of the discharge pipe 4. The pumping unit includes a pump 5 which is usually of the centrifugal type, and an electric motor 6 for operating it. The motor is operatively connected to the pump by means of shaft 7 and is supported in the upper part of a long tubular housing 8. This housing is closed at its upper end by a cover 9, but is open to freely admit the well liquid at its lower end 10. The length of housing 8 is so proportioned with respect to the depth to which it is to be submerged, that the air or gas trapped within it will be of sufficient volume when compressed by the well liquid to maintain the liquid level 11 below the motor.

To ensure the volume of the gaseous atmosphere surrounding the motor being maintained sufficiently large to keep the surface 11 of the liquid below the motor, means are provided for supplementing it by additional quantities of gas. Thus, suspended in casing 8 a short distance below motor 6, is a basket or pan 12 carrying some gas producing chemical reagent. Such reagent may be aluminum sulphate and calcium carbonate in combination; or any other material that can readily evolve gas, as hydrochloric acid and calcium carbonate. This material is indicated at 13, and can be conveniently supplied through a pipe 14, which extends to the top of the well. In the event that the supply of gas is greater than actually needed, no difficulty is encountered, since the surplus gas can readily escape from below the open ended housing.

To obviate the necessity of a running seal or stuffing box when shaft 7 passes out of casing 8, the following construction is employed. A tube 16 surrounding shaft 7 is secured in the top 9 of casing 8, and extends substantially to the lower end of the casing. This forms an annular chamber 17, in the upper end of which the motor 6 is positioned. Surrounding tube 16 is a tubular shaft 18, on which is secured the rotating member 19 of the motor. The stationary member 20 of the motor is secured to the wall of housing 8 and has the usual windings 21. These are supplied with electric current from a source outside the well by means of a waterproof cable, not shown. Shaft 18 is rotatably supported by bearings 22 and 23 suitably supported in casing 8 and provided with lubricating means. The lower bearing 23, acts as a thrust bearing to support the shaft and rotor.

Shaft 18 extends downwardly to the bottom of the casing and below tube 16, where it is connected to the pump shaft 7 in any desired manner, as by having an inwardly extending flange 24 threadedly engaging shaft 7. Basket 12 has a clearance opening 25 through which shaft 18 passes.

Brief consideration will show that the well liquid is free to enter the top of tube 16, flow downwardly in the space between this tube and shaft 7, and thence upwardly in the space between the tube 16 and the hollow shaft 18. However, the trapped gas or air in the casing 8 will be effective to check the rise of liquid in the space between tube 18 and hollow shaft 20 and maintain the surface of the liquid in this space at the same height as liquid surface 11.

What is claimed is:

1. In a submersible structure, a housing open at the bottom, a rotatable drive mechanism in said housing, and means for supplementing the gas trapped in said housing, comprising a chemical reagent acting to evolve gas.

2. In a submersible structure, an electric motor having a rotating winding member, means forming a housing for said motor, said housing being gas tight except for an opening at the bottom, said opening being large enough to permit substantially instantaneous equalization of pressure inside and outside the housing, a load driving shaft extending above said housing and adapted to be connected to a pump, means forming a driving connection between said shaft and said rotating member and means for supplying gas to said housing, said means comprising a chemical reagent acting to evolve gas.

3. In a submersible structure, a housing open at the bottom, a rotatable drive mechanism in said housing, and means for supplementing the gas trapped in said housing, comprising a basket suspended in the housing, and a chemical reagent in said basket acting to evolve gas.

4. In a structure adapted to be submerged in a well, a housing open at the bottom, a rotatable drive mechanism in said housing, and means for supplementing the gas trapped in said housing, comprising a basket suspended in the housing, a chemical reagent in the basket acting to evolve gas, and means to replenish said chemical reagent from the top of the well.

FRANK MASON.
THOMAS G. MYERS.